March 17, 1970     F. T. SMITH     3,500,987
RECLAIMER

Original Filed Oct. 24, 1965     8 Sheets-Sheet 1

INVENTOR.
Fred T. Smith

BY     ATTORNEYS

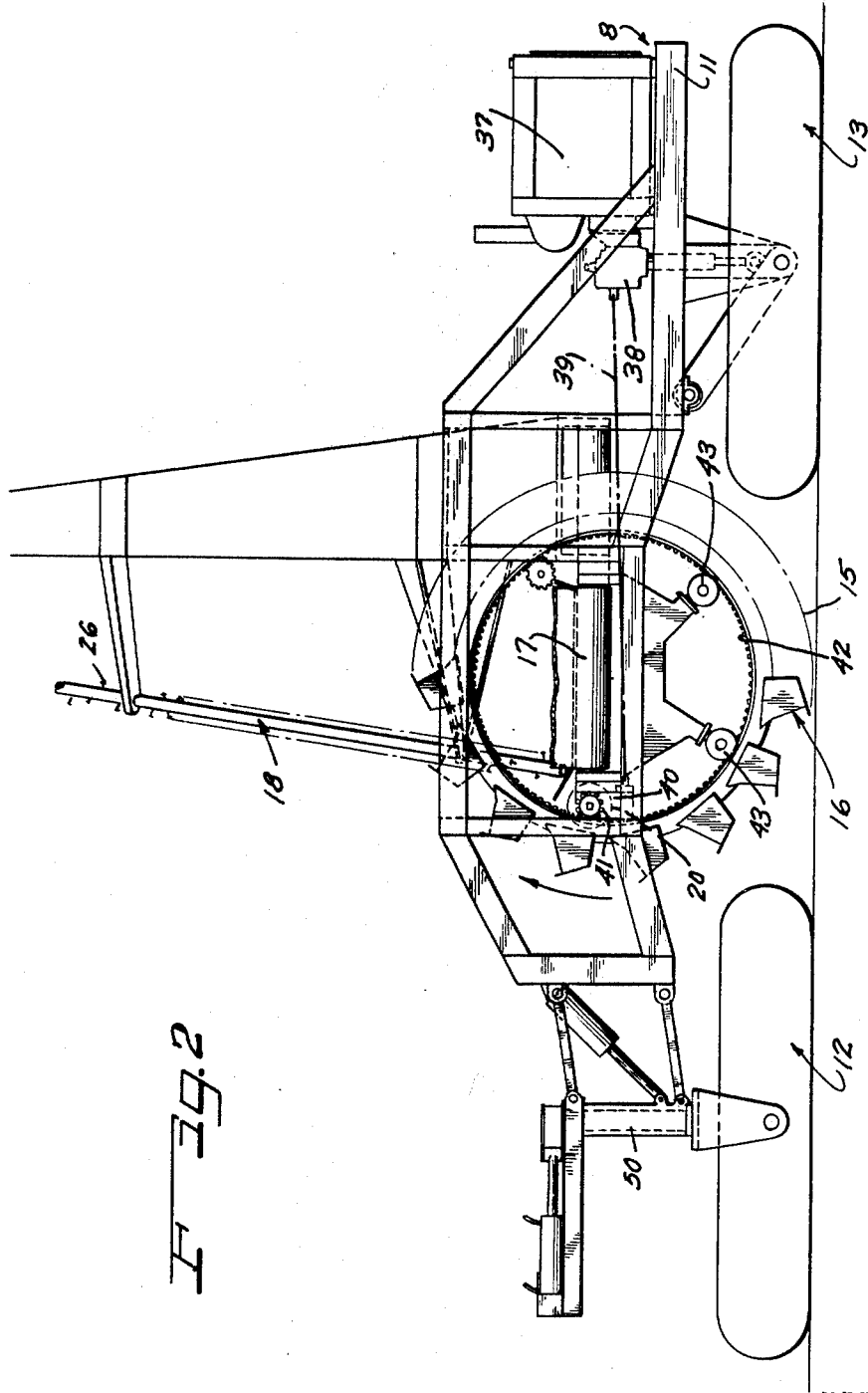

March 17, 1970  F. T. SMITH  3,500,987
RECLAIMER
Original Filed Oct. 24, 1965  8 Sheets-Sheet 3
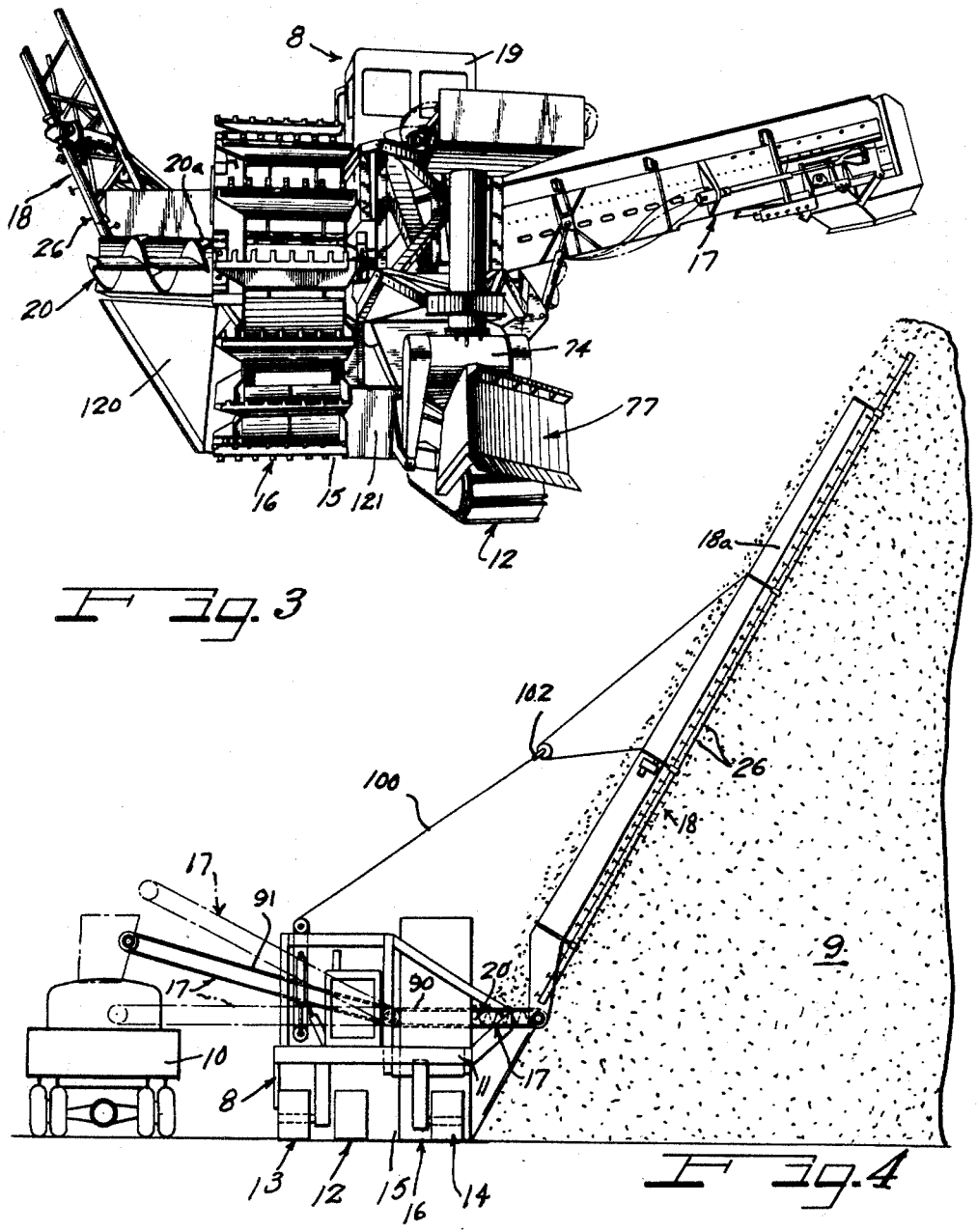
INVENTOR.
Fred T. Smith
BY  ATTORNEYS

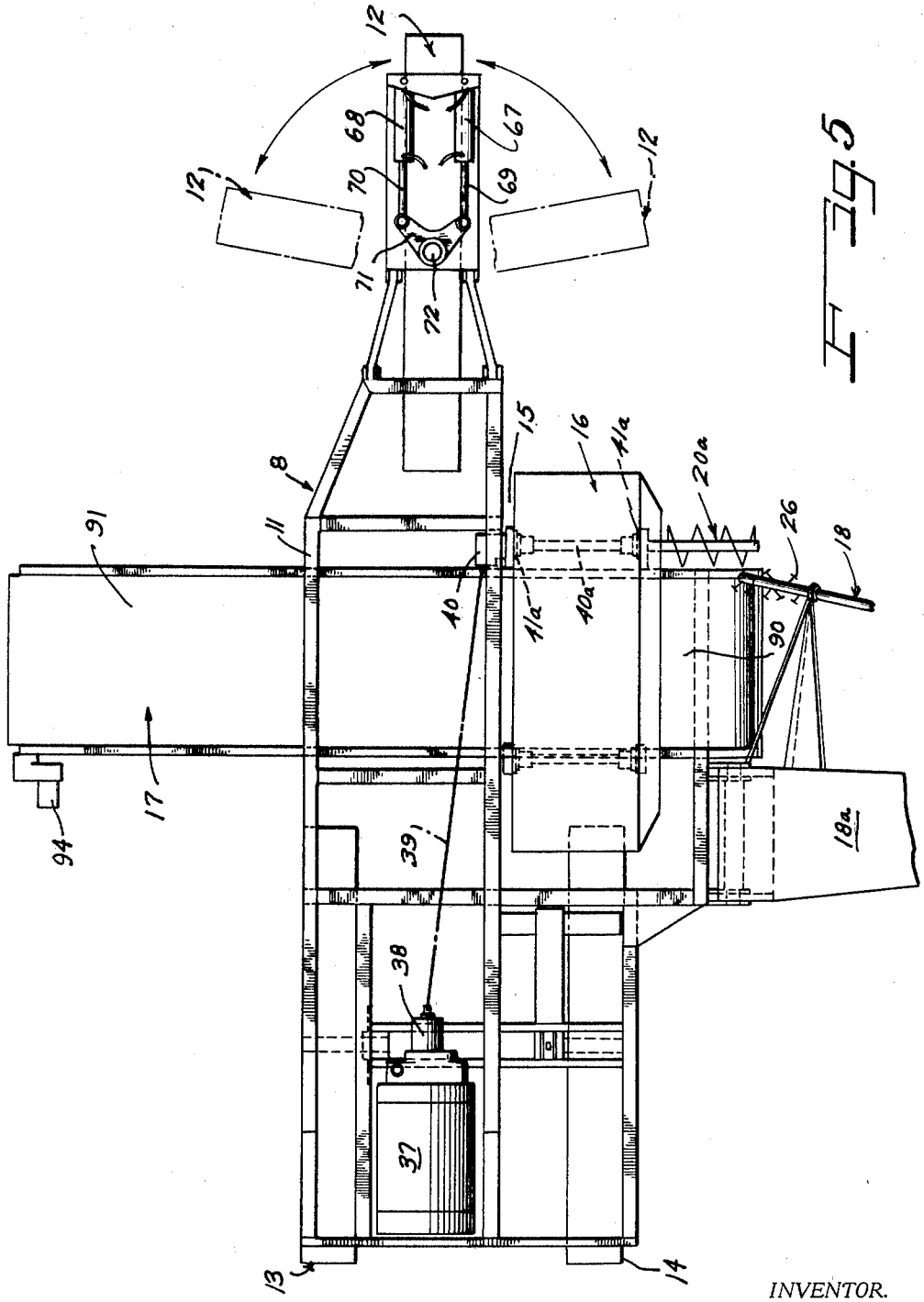

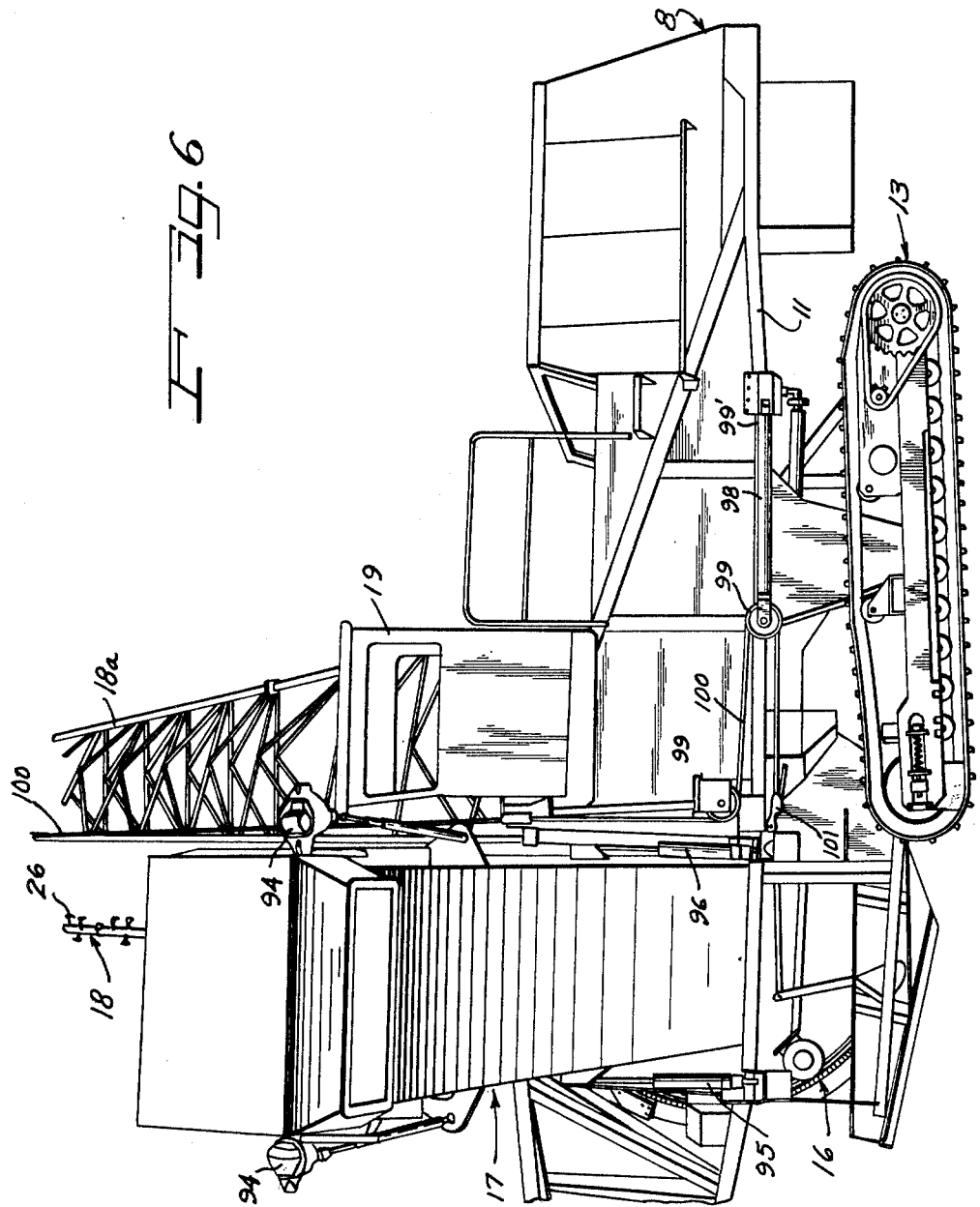

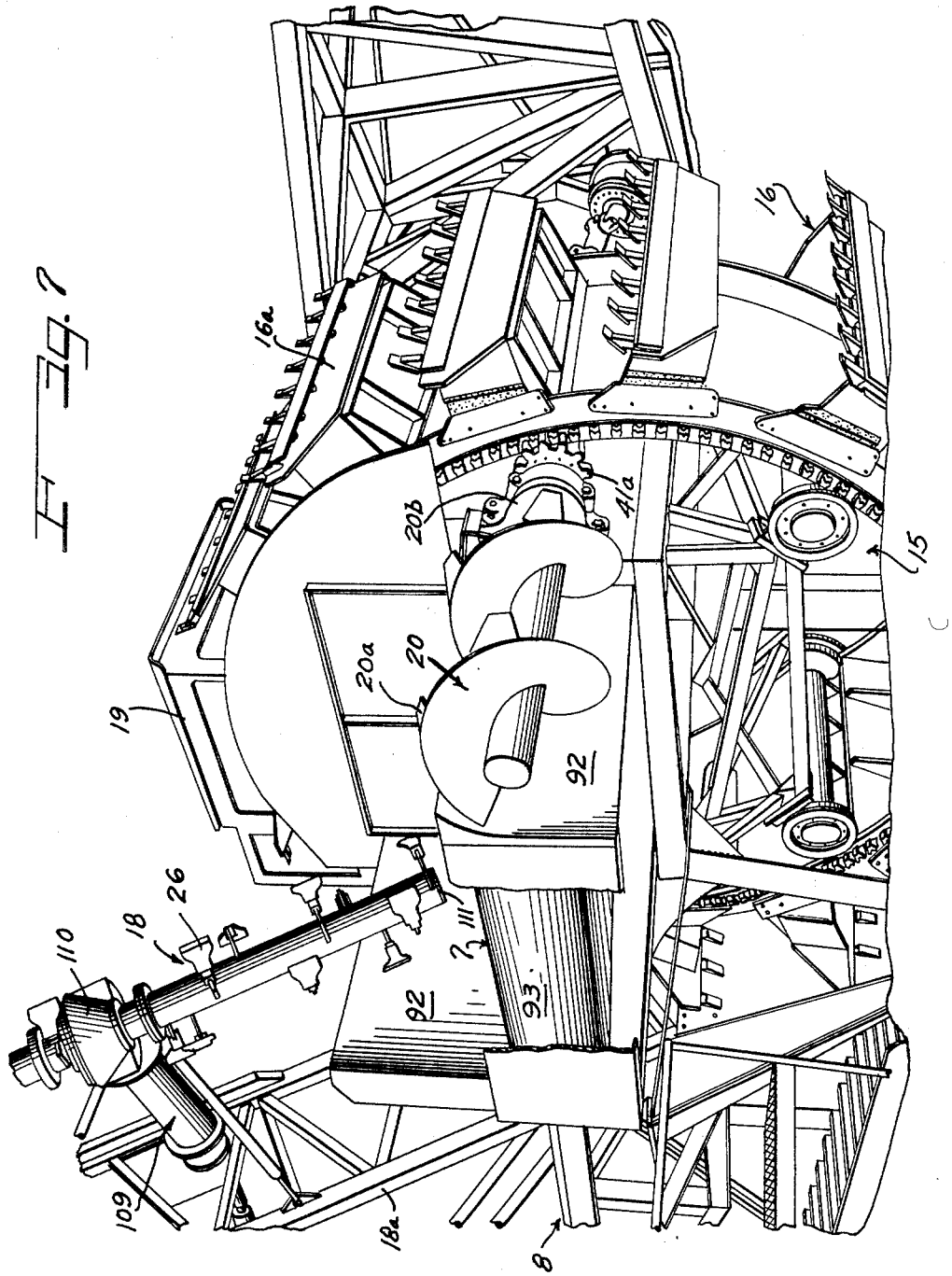

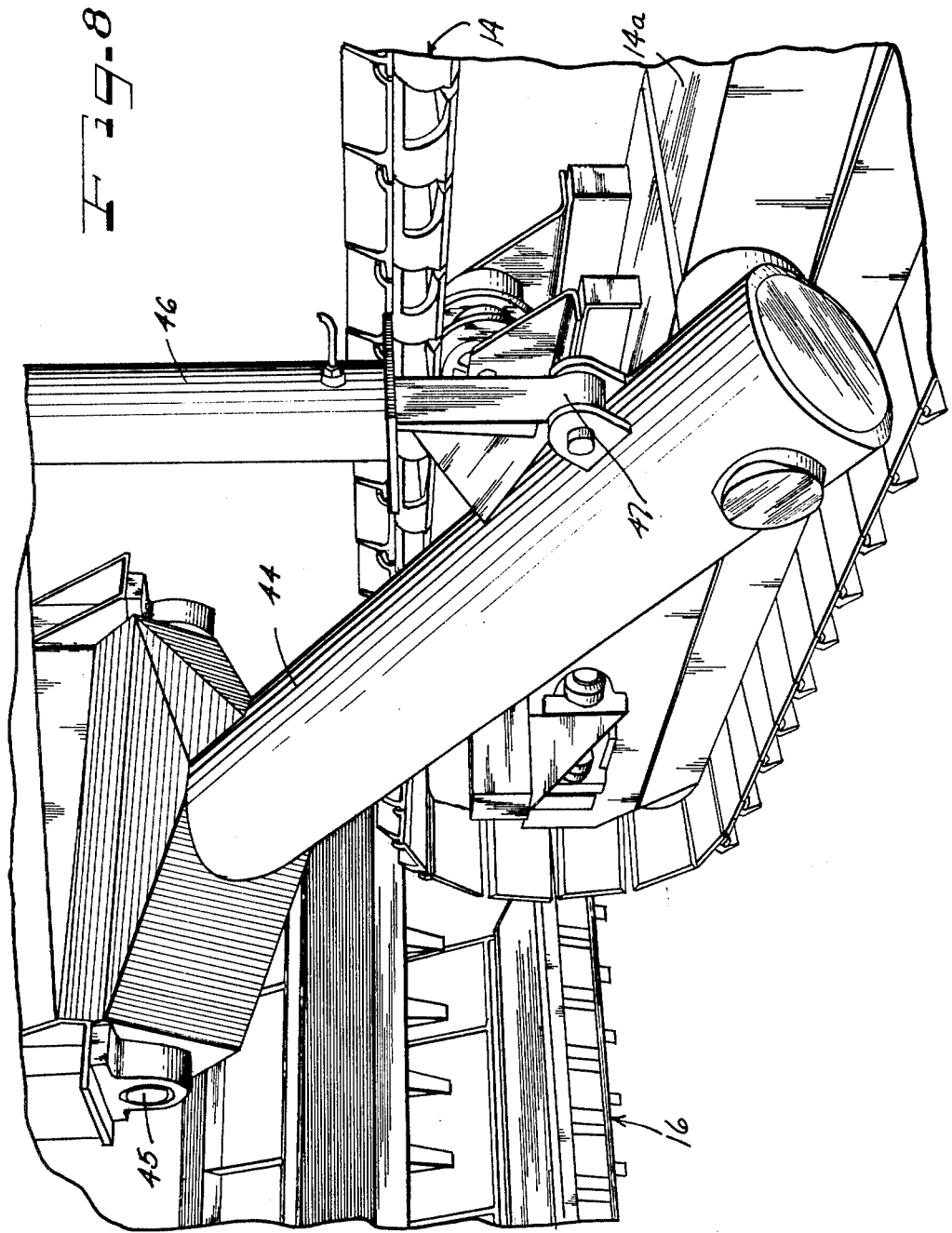

March 17, 1970  F. T. SMITH  3,500,987
RECLAIMER
Original Filed Oct. 24, 1965  8 Sheets-Sheet 8
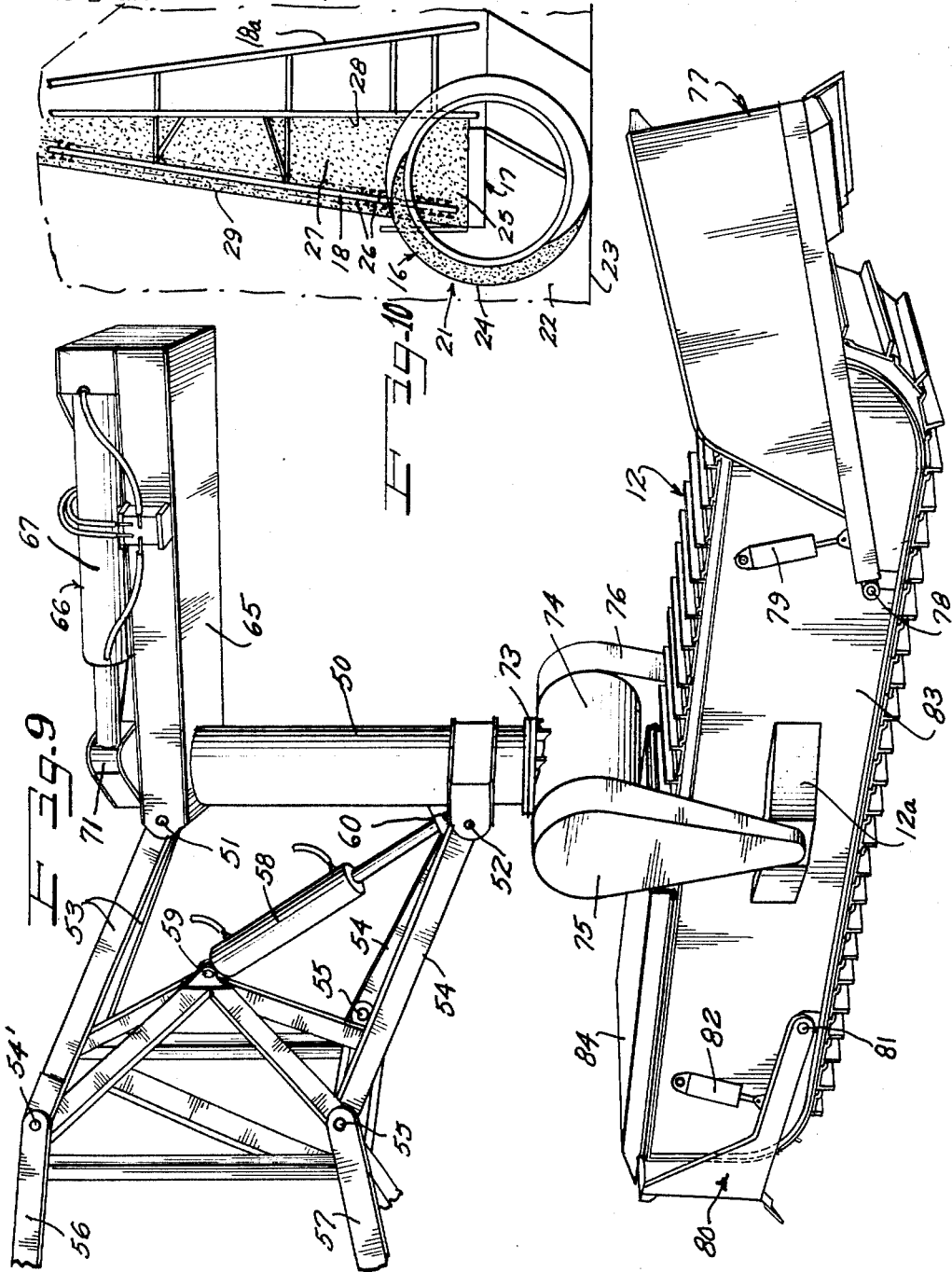
INVENTOR.
Fred T. Smith
BY
ATTORNEYS

United States Patent Office 3,500,987
Patented Mar. 17, 1970

3,500,987
RECLAIMER
Fred T. Smith, Aurora, Ill., assignor to Barber-Greene Company, Aurora, Ill., a corporation of Illinois
Continuation of application Ser. No. 504,739, Oct. 24, 1965. This application May 8, 1969, Ser. No. 823,189
Int. Cl. B65g 65/28
U.S. Cl. 198—36                                29 Claims

ABSTRACT OF THE DISCLOSURE

This disclosure concerns a machine for converting a stockpile of material into a moving stream of material for loading into another area. More specifically, a machine is provided having a main frame with front and rear propelling means as well as a wheel receiving area with a digging wheel mounted on the frame at one side. A conveyor is also carried on the frame positioned for receiving materials from the digging wheel, and a sloper is mounted on the frame and angled upwardly and away from one side of the digging wheel for causing materials to be moved from a stockpile into the path of the digging wheel and/or onto the conveyor.

---

This application is a continuation of application Ser. No. 504,739, filed Oct. 24, 1965, now abandoned.

The present invention relates generally to a machine here identified as a reclaimer. This machine is adapted to convert a pile of material into a moving stream whereby the material can be loaded into a suitable receptacle such as a truck, railroad car or the like. According to this invention the reclaimer includes as components a sloper for resting on the pile in a plane extending generally transversely of the longitudinal plane of the reclaimer and the path of travel of the reclaimer. As the reclaimer and its sloper move alongside of the pile the sloper cuts into the pile at elevated points to cause material to be dug and released from the pile and flowed as a stream onto a cross conveyor. A circular type digging wheel is also mounted at one side of the reclaimer and the same conveyor extends transversely through the digging wheel and functions to carry materials dug by the digging wheel in addition to those materials caused to be flowed onto the conveyor by means of the operation of the sloper all in accordance with important features of this invention.

According to other important features of the present invention, the reclaimer employs a three-point suspension with the digging wheel and sloper disposed at one side of the front-point of suspension whereby the torque forces can be decreased to balance the digging forces of the digging wheel.

According to still other important features of the present invention, the front point of suspension or crawler has means for steering the reclaimer as well as means for controlling the depth of cut of the digging wheel.

Other important features of this invention relate to the novel method of causing the pile to be dug at a number of spaced points and then causing the dug materials to be joined into a common stream for deposition into a receptacle or truck to be loaded.

According to still more specific features of this invention, the reclaimer employs a novel three-point suspension including three crawlers with the digging wheel disposed forward of the rear pair of crawlers and at one side of the front crawler with the sloper being pivotally mounted on the machine frame and extending in an inclined direction away from one side of the digging wheel with means being provided for raising and lowering the sloper for controlling its elevation.

Other features of this invention are concerned with a novel relationship of elements whereby operating a ram between the reclaimer frame and the front crawler the elevation of the digging wheel as well as the sloper can be regulated.

Another feature of this invention is concerned with the provision of means horizontally aligned and forward of the cross conveyor for digging into the pile and providing a clearance area for positioning of the conveyor enabling a lower end of the sloper to be positioned over the conveyor for direct deposit of sloper cut materials onto the conveyor.

A further feature of this invention relates to the method of reclaiming a pile of material which comprises cycloidally rotating a series of cutters along the slope of the pile into a pile bank creating a stream of downward flowing material, and creating a dam on the rearward side of the cutters confining the downward flow of material between the dam and the pile bank to minimize lateral uncontrolled flow of the cut material.

Still another feature of this invention relates to the provision of plow means on the front crawler for directing portions of the pile into the path of the digging wheel.

Still other features of this invention relate to the position of the plows on opposite sides of the digging wheel for directing pile spillings into the path of the digging wheel.

Another and still further feature of this invention relates to the mounting of a pile cutter on a sloper boom and with the boom having damming means along a face opposite the cutter for confining downward flow of cut material between the damming means and the sloped bank being cut.

In view of the foregoing it will be appreciated that an important object of this invention is to provide a new and improved machine and method for converting a pile of material into a fast moving controlled stream whereby the stream can be suitably unloaded such as in a receptacle, truck and the like.

A still further important object of this invention is to provide a new and improved machine capable of cutting down a bank of material as well as the sloped face of the material so that the amount of material being dug per running foot of the machine can be maintained at a maximum level.

According to still another feature of this invention, by disposing the wheels or track at the rear of the digging wheel and in front of the digging wheel, a large movement arm is provided so that the reaction forces become very small and the moment in the machine due to the digging forces is resisted.

Other objects and features of this invention will more fully become apparent in view of the following detailed description taken in conjunction with the accompanying drawings illustrating a single embodiment and in which:

On the drawings:

FIGURE 2 is a fragmentary diagrammatic side view of the reclaimer shown in FIGURE 1;

FIGURE 3 is a fragmentary front view of the reclaimer;

FIGURE 4 is a diagrammatic rear view of the reclaimer shown in FIGURE 1;

FIGURE 5 is a fragmentary diagrammatic view of the reclaimer shown in FIGURE 1;

FIGURE 6 is a fragmentary side view of the reclaimer as viewed from the side where the materials are unloaded;

FIGURE 7 is an enlarged fragmentary perspective view of the reclaimer illustrating the digging wheel side of the machine where the materials are unloaded;

FIGURE 8 is an enlarged fragmentary view of the right rear crawler;

FIGURE 9 is an enlarged fragmentary view of the front crawler and its steering mechanism; and FIGURE 10 is a side elevation of the machine illustrating diagrammatically the method of reclaiming the pile.

As shown on the drawings:

Figure 1:
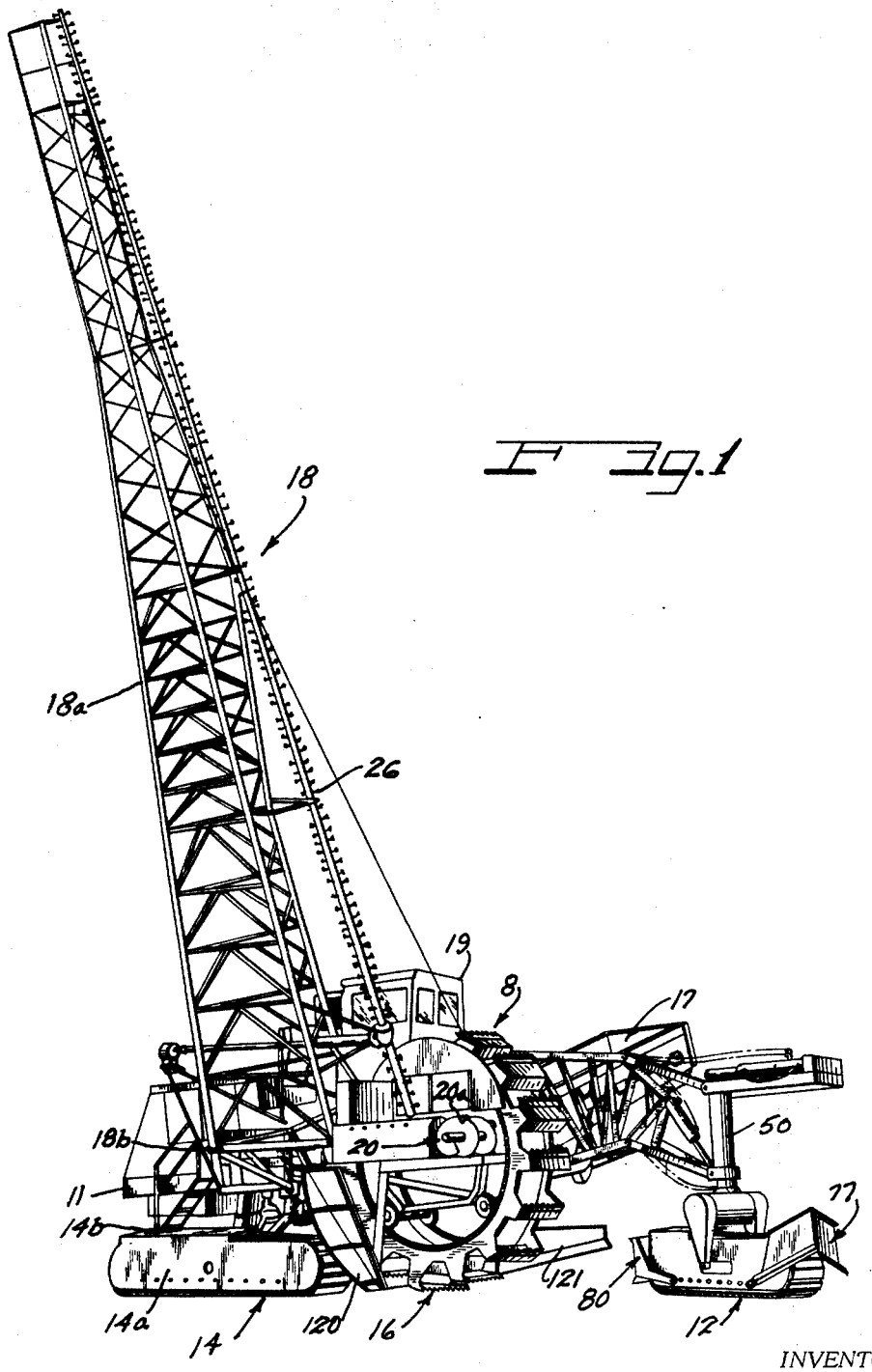
FIGURE 1 is a perspective view of my reclaimer.

The reference numeral 8 indicates generally my reclaimer or reclaimer machine for moving material from sloped pile 9 to a truck 10. It is significant to note that the machine 8 and the truck 10 are at the same level while the truck is being loaded. The reclaimer differs from conventional trenching machines of the digging wheel type with this type of machine disposed above the ground level and its digging wheel extends below ground level. The present reclaimer 8 differs thereover in that it is adapted to move transversely of the material to be excavated rather than directly into the material and the digging wheel is disposed generally at the same level as the crawlers or wheels.

GENERAL DESCRIPTION

The reclaimer 8 includes as components a frame 11 mounted on a front crawler 12 and inside and outside rear crawlers 13 and 14. As previously mentioned, the machine is provided with a three wheel or three track motivating system and the wheel movement enables precision control of the digging wheel. A wheel receiving area 15 is provided between the front and rear tracks to one side of the front track and a digging wheel 16 is disposed therein and carried by the main frame 11. The digging wheel 16 has a series of buckets 16a for digging into a bank of material.

A cross conveyor 17 extends through the digging wheel 16 and is supported on the frame for receiving dug materials from the digging wheel. A sloper 18 is pivotally mounted on the frame 11 for digging into and freeing materials from the sloped face of the pile. Suitable controls are provided within an operator's cab 19 for operating the various components of the machine including an auger 20 which is positioned immediately forward of the conveyor 17 embodying important features of this invention.

METHOD DESCRIPTION

According to method features of this invention, the sloped pile 9 includes a bank 21 having an angled side face 22 in which the material is reposed at an angle relative to a floor area 23 in immediate adjacency thereto. The method here involved includes the steps of digging into the pile along the side face at a restricted area of the face (comprising the area of the digging wheel) with respect to the total length of the side face and continuing such digging along the length of the side face. The thus dug material is then elevated above the floor at 24 (FIGURE 10). A main stream of material 25 is then created from the thus elevated material that flows above the floor area 23 and such stream is directed in angular relation away from the side face 22 and discharged above the floor into the awaiting receptacle truck 10 (FIGURE 4).

According to further important features of my method, a series of cutters 26 are cycloidally rotated causing the angled side face of the pile to be dug over an area which extends a substantial distance above the lower end of the side face along the slope of the pile creating a downward stream of flowing material 27. The downward stream flowing material is merged with the main stream 25. As the downward flowing stream of material is generated, a dam 28 is created on the rearward side of the cutters along the sloper boom which operates to confine the downward flow of material between the dam and a sloped bank 29 to minimize lateral uncontrolled flow of the cut material.

DETAILED DESCRIPTION

An engine 37 is mounted on the frame 11 for operating the digging wheel 16, the sloper 18 and the auger 20.

Coupled with the engine 37 is a transmission or gear box 38. A drive shaft 39 is in turn connected at one end to the transmission and at an opposite end to an angle box 40 for driving the digging wheel 16 by means of a gear 41a and an internal gear 42. An angled digging wheel driven shaft 40a carries the gears 41 and 41a. The frame structure 11 is also provided with guide or support rollers 43 for supporting the digging wheel on the main frame (FIGURE 2).

The rear crawler 14 is mounted on a track pivot arm 44 that is in turn pivotally mounted at 45 (FIGURE 8) on the main frame 11. A hydraulic cylinder 46 is connected to an opposite end 47 of the track pivot arm 44 for moving the main frame 11 vertically relative to track frame 14a of the track 14. Suitable controls are provided at the cab 19 for controlling the hydraulic cylinder 46 whereby the digging angle of the digging wheel 16 can be regulated.

The front crawler 12 (FIGURE 9) is joined with a frame supporting column 50 for supporting the front end of the frame 11. This column 50 is in turn pivotally secured at 51 and 52 to the main frame 11 by means of the pairs of pivotal parallel column support arms 53 and 54. These arms 53 and 54 are in turn pivotally connected at 54' and 55 to fixed arms 56 and 57 carried on the frame 11. A hydraulic cylinder 58 is pivotally secured at 59 to the main frame between the pairs of arms 53 and 54 and at 60 to the column 50. Suitable controls are provided at the operator's cab 19 for regulating the operation of the hydraulic cylinder 58 to control the digging depth of the digging wheel 16. The column 50 has an upper column arm 65 which carries means 66 (FIGURES 5 and 9) for steering the reclaimer and more particularly the front crawler 12. The means 66 includes a pair of side-by-side hydraulic cylinders 67 and 68. These cylinders are provided with rams 69 and 70 which are connected to steering post connector 71 that is mounted on a steering post 72. The column 50 has a bearing 73 between the column and the steering post 72. The lower end of the steering post 72 is connected to a crawler yoke 74 which has arms 75 and 76 joined with the track frame 12a.

Mounted on a front end of the front crawler frame 12a is a V-shaped front plow 77 that is so shaped that when the machine is forwardly driven that materials encountered in front of the plow are plowed into the path of the digging wheel. The plow 77 is mounted at opposite sides on pivots 78 and is hydraulically controlled by means of a hydraulic cylinder 79 for raising and lowering the plow. Suitable controls are provided at the cab for controlling the plow. Also, a rear plow 80 is provided on the front crawler frame 12a. The plow 80 is pivotally mounted at 81 on the crawler frame 12a and has a hydraulic cylinder 82 for controlling movement of the plow by means of suitable controls provided at the operator's cab. When the reclaimer machine is driven rearwardly, the plow 80 can be lowered into plowing position, if desired.

It should be further noted that the crawlers or transporting and propelling means are driven by hydraulic motors (not shown) which are in turn coupled with hydrostatic transmissions (not shown) and are operable through suitable controls from the cab. The front crawler is also provided with a front crawler side shield 83 and an upper crawler shield 84 for protecting the crawler from cave-ins and the like during the operation of the machine. It should be noted that the rear shield 84 extends over the track and overhangs a portion of the rear plow 80 to prevent jamming of the tracks.

The auger 20 is mounted transversely of the main frame 11 and transversely of the digging wheel 16. The auger 20 provides means to convey dug material horizontally to the digging wheel 16 which material is dropped into the buckets at the ground level and picked up by the buckets and then transmitted and dumped onto the cross conveyor 17. The auger 20 is disposed in horizontal alignment with the conveyor 17 (FIGURE 7) and extends outwardly from one side of the digging wheel 16 as shown in FIGURE 5 for the purpose of undercutting the pile being cut so that the conveyor can underlap the pile and permit the materials being dug by the sloper 20 to fall directly onto the conveyor 90 as shown in FIGURE 5. By regulating the flow or stream of material falling from the sloped surface of the pile so that such material falls directly onto the conveyor, the digging wheel can then work at full capacity in connection with excavating the material at the side of the pile. According to still further features of this invention, the auger 20 is provided with auger teeth 20a which are angled to one side of the auger blade which assist in the digging into a pile of relatively hard material.

From FIGURE 3 it will be seen that the auger 20 has its shaft directly coupled with angled driven digging wheel drive shaft 40a. The auger is carried by an auger bearing 20b that is suspended from the frame (FIGURE 7). If desired, a separate hydrostatic transmission can be provided for driving the auger.

A conveyor system 17 is provided for moving the materials dug by the digging wheel 16 from the digging wheel to the truck 10. To this end, a first conveyor 90 is provided which is positioned at one end adjacent to the auger 20 for receiving materials from the sloper 18 and the digging wheel 16. The conveyor 90 is associated with an angled conveyor 91 for delivering materials to an unloading station at its outer end. The conveyor 80 has side plates 92—92 (FIGURE 7) cooperable with a first conveyor belt 93 forming a trough to control the material dumped onto the belt 93 from the buckets 16a in the movement of the material to the unloading station at the outer end of the conveyor 91. The conveyors 90 and 91 are dirven by hydraulic motors such as shown at 94—94 in FIGURE 6. Hydraulic cylinders 95 and 96 (FIGURE 6) are positioned between the frame and the conveyor 91 for controlling its elevation. Suitable controls are provided at the cab for regulating the angular position of the conveyor 91.

SLOPER

The sloper 18 is mounted at right angles relative to the digging wheel. More particularly, the sloper 18 includes a boom 18a and the forward edge of the boom 18a comprised the dam indicated at 28 in FIGURE 10. The dam consists of series of plates mounted along the vertical extent of the boom 18a for providing a closed area for coacting the sloped bank 29 to provide a method of controlling the downward flow of materials cut by the sloper so that such materials can be readily deposited upon the conveyor 90 with a minimum spillage.

The sloper 18 has the cutters 26 mounted along the length of a cutter drive shaft. The cutters and the device for driving the cutter drive shaft will be the subject of a separate application for patent.

The elevation of the sloper 18 is controlled by a hydraulic 98 (FIGURE 6) that is connected to the frame at its end 99'. The pivot rod of the cylinder 98 is joined to a pulley 99. A cable 100 is joined at one end 101 to the frame 11 and at an opposite end 102 to the sloper boom 18a. Suitable controls are provided at the operator's cab for regulating the operation of the cylinder 98 for pivoting the sloper boom 18a on its boom pivots 18b. The sloper is driven from the engine by a V-belt drive to an angle drive 109 carried on the sloper boom (FIGURE 7) to a gear box 110. It will further be noted that the lower end of the cutter shaft 111 is generally aligned with a leading or forward edge of the conveyor 93 so that as the cutter rotates and as the machine moves forwardly on its crawler tracks, a cycloidal curve will be generated by the cutters 26 to effect cutting of the sloped pile. By operation of the hydraulic cylinder 98, the position of the sloper 18 can be controlled so that the sloper may be lowered to an angle of about 45° or elevated to nearly a vertical position. This angle is determined by the best position for the flow of material onto the conveyor 93.

As shown in FIGURES 1 and 3, plows 120 and 121 are positioned at opposite of the digging wheel for the purpose of plowing materials into the path of the digger buckets so that such materials can be lowered onto the conveyor 17. The cone-shaped plow 120 is of a triangular construction and projects upwardly and outwardly from its lower end in such a manner that the upper end of the plow underlies the outer end of the auger 20. The plow 121 extends at an angle relative to the digging wheel 16 so that materials contacting the plow will be caused to be plowed into the bottom area of the digging wheel 16. The cone-shaped plow 120 extends rearwardly beneath the lower back side edge of the conveyor 93 to pick up any materials which may miss being trapped between the side plates 92 to flow such material back into the digging wheel 16 so that interference with the operation of the inside crawler 14 can be minimized.

The present machine has been tested and has been found to be capable of cutting into a pile and converting materials dug into a fast moving stream of material whereby a 12-ton truck can be loaded in the manner of two or three minutes. It has been found that the present machine has a capacity of exceeding the production of two large shovels which have been commonly used for the purpose of loading materials from a pile into a truck.

Although minor modifications might be suggested by those versed in the art, it should be understood that I wish to embody within the scope of the patent warranted hereon, all such modifications as reasonably and properly come within the scope of my contribution to the art.

I claim:
1. A reclaimer comprising:
 a main frame,
 front and rear frame propelling means on the frame with the front frame propelling means being offset to one side of at least one of the rear frame propelling means providing a wheel receiving area,
 a digging wheel rigidly mounted at one side of said main frame in said wheel receiving area and positioned directly ahead of one of the rear frame propelling means and transversely to one side of said front frame propelling means,
 a conveyor positioned on the frame receiving materials from the digging wheel, and
 a sloper mounted on the frame and angled upwardly and away from one side of the digging wheel for causing materials to be deposited on said conveyor.
2. A materials handling machine comprising:
 a main frame,
 front and rear frame propelling means on the frame with the front frame propelling means being offset to one side of at least one of the rear frame propelling means providing a wheel receiving area,
 a digging wheel rigidly mounted at one side of said main frame in said wheel receiving area and positioned directly ahead of one of the rear frame propelling means and transversely to one side of said front frame propelling means,
 a conveyor positioned on the frame receiving materials from the digging wheel,
 a sloper mounted on the frame and angled upwardly and away from one side of the digging wheel for causing materials to be deposited on said conveyor,
 engine means mounted on said main frame for driving said digging wheel, and
 means for driving said sloper.
3. A reclaimer comprising:
 a main frame,
 front and rear frame propelling means on the frame with the front frame propelling means being offset to one side of at least one of the rear frame propelling means providing a wheel receiving area, a digging wheel rigidly mounted at one side of said main frame in said wheel receiving area and positioned directly ahead of one of the rear frame propelling means and transversely to one side of said front frame propelling means, an auger mounted at right angles to said digging wheel for moving material into said digging wheel, a conveyor positioned on the frame receiving materials from the digging wheel, and a sloper mounted on the frame and angled upwardly and away from one side of the digging wheel for causing materials to be deposited on said conveyor.

4. A reclaimer comprising:
a main frame,
front and rear frame propelling means on the frame with the front frame propelling means being offset to one side of at least one of the rear frame propelling means providing a wheel receiving area,
a digging wheel rigidly mounted at one side of said main frame in said wheel receiving area and positioned directly ahead of one of the rear frame propelling means and transversely to one side of said front frame propelling means,
an auger mounted at right angles to said digging wheel for moving material into said digging wheel,
means for rotating said auger,
a conveyor positioned on the frame receiving materials from the digging wheel,
a sloper mounted on the frame and angled upwardly and away from one side of the digging wheel for causing materials to be deposited on said conveyor,
engine means mounted on said main frame for driving said digging wheel, and
means for driving said sloper.

5. A reclaimer comprising:
a frame,
front and rear frame propelling means supporting the frame with the front frame propelling means being offset to one side of at least one of the rear frame propelling means providing a wheel receiving area,
a digging wheel rigidly mounted at one side of said frame in said wheel receiving area and positioned directly ahead of one of the rear frame propelling means,
a conveyor positioned on the frame receiving materials from the digging wheel,
a sloper mounted on the frame and angled upwardly and away from one side of the digging wheel for causing materials to be deposited on said conveyor, and
an auger mounted at one side of said digging wheel forwardly of said sloper for moving material into said digging wheel and with the auger clearing the way for a lower end of the conveyor.

6. A material handling machine comprising:
a frame,
front and rear frame propelling means supporting the frame with the front frame propelling means being offset to one side of at least one of the rear frame propelling means providing a wheel receiving area,
a digging wheel rigidly mounted at one side of said frame in said wheel receiving area and positioned directly ahead of one of the rear frame propelling means and transversely to one side of said front frame propelling means,
a conveyor positioned on the frame receiving materials from the digging wheel,
a sloper mounted on the frame and angled upwardly and away from one side of the digging wheel for causing materials to be deposited on said conveyor, and
means between said front propelling means and said frame for varying the vertical position therebetween for varying the depth of cut of the digging wheel.

7. A material handling machine comprising:
a frame,
front and rear frame propelling means supporting the frame with the front frame propelling means being offset to one side of at least one of the rear frame propelling means providing a wheel receiving area,
a digging wheel rigidly mounted at one side of said frame in said wheel receiving area and positioned directly ahead of one of the rear frame propelling means and transversely to one side of said front frame propelling means,
a conveyor positioned on the frame receiving materials from the digging wheel,
a sloper mounted on the frame and angled upwardly and away from one side of the digging wheel for causing materials to be deposited on said conveyor,
an auger mounted at one side of said digging wheel forwardly of said sloper for moving material into said digging wheel and with the auger clearing the way for a lower end of the conveyor, and
means between the frame and the front frame propelling means for steering the machine.

8. A reclaimer comprising:
a frame,
frame propelling means on the frame,
a digging wheel rigidly mounted on said frame,
a conveyor positioned on the frame receiving materials from the digging wheel,
a sloper mounted on the frame and angled upwardly and away from one side of said digging wheel for causing materials to be deposited on said conveyor, and
an auger mounted on said frame ahead of a lower end of said sloper for providing clearance and for depositing materials in the path of the digging wheel for pick-up.

9. A material handling machine comprising:
a frame,
frame propelling means on the frame including a front end propelling means,
a digging wheel rigidly mounted on said frame,
a conveyor positioned on the frame transversely of the digging wheel receiving materials from the digging wheel for conveying materials to one side of the digging wheel,
means between said front end propelling means and said frame for varying the vertical position of the frame as well as the digging wheel with respect to the front end propelling means to enable the depth of cut to be varied, and
an auger mounted in the frame and extending outwardly beyond the digging wheel and in line with said conveyor for clearing the material from the path of forward travel of the machine and enabling the conveyor to be positioned beneath the stockpile of material.

10. A material handling machine comprising:
a frame,
a digging wheel rigidly mounted on said frame,
a conveyor positioned on the frame transversely of the digging wheel receiving materials from the digging wheel for conveying materials to one side of the digging wheel, and
an auger mounted on the frame and extending outwardly beyond the digging wheel and in line with said conveyor for clearing the material from the path of the forward travel of the conveyor and enabling the conveyor to be positioned beneath the stockpile of material and for directing the dug material into the path of the digging wheel.

11. A material handling machine comprising:
a frame having frame propelling means,
a digging wheel secured to said frame, a conveyor positioned on the frame receiving materials from the digging wheel, a sloper mounted on the frame and angled upwardly and away from one side of the digging wheel for causing materials to be deposited directly on said conveyor, and means for varying the angle of the sloper relative to the frame.

12. A material handling machine comprising:

a frame having frame propelling means including a front frame transporting means, a digging wheel mounted on said frame and positioned at one side of said front frame transporting means, a conveyor carried by the frame for receiving materials from the digging wheel, a plow mounted on said front frame transporting means, a sloper mounted on the frame and angled upwardly and away from one side of the digging wheel for causing materials to be deposited directly on said conveyor, and means for raising and lowering said plow into and out of a plowing position relative to said front frame transporting means.

13. A material handling machine comprising:

a frame having frame propelling means including a front frame transporting means, a digging wheel mounted on said frame and positioned at one side of said front frame transporting means, a conveyor carried by the frame for receiving materials from the digging wheel, a sloper mounted on the frame and angled upwardly and away from one side of the digging wheel for causing materials to be deposited directly on said conveyor, and plows mounted on said frame on opposite sides of said digging wheel and projecting diagonally of the digging wheel for plowing material into the path of the digging wheel.

14. A material handling machine comprising:

a frame having transporting means, digging wheel mounted generally at one side of said frame, a conveyor positioned on the frame and extending outwardly on opposite sides of the digging wheel with one end being a loading end and an opposite end comprising a discharge end, a sloper mounted on the frame and angled upwardly and away from one side of the loading end of the conveyor for causing materials to be deposited directly thereon, and means for varying the angle of inclination of the sloper relative to a vertical plane parallel to said digging wheel.

15. A material handling machine comprising:

a frame having transporting means, a digging wheel mounted generally at one side of said frame, a conveyor positioned on the frame and extending outwardly on opposite sides of the digging wheel with one end being a loading end and an opposite end comprising a discharge end, a sloper mounted on the frame and angled upwardly and away from the loading end of the conveyor for causing materials to be deposited thereon, an auger mounted forward of the loading end of the conveyor and the sloper for digging a path of travel through the material allowing free passage of these components therethrough, and means for varying the angle of inclination of the sloper relative to a vertical plane through said digging wheel.

16. A material handling machine comprising:

a frame having transporting means, a digging wheel mounted generally at one side of said frame, a conveyor positioned on the frame and extending outwardly on opposite sides of the digging wheel with one end being a loading end and an opposite end comprising a discharge end, a sloper mounted on the frame and angled upwardly and away from one side of the loading end of the conveyor for causing materials to be deposited directly thereon, troughing means on opposite sides of the conveyor including the loading end for entrapping material discharged thereon through the operation of the sloper, and means for varying the angle of inclination of the sloper relative to a vertical plane through said digging wheel.

17. A reclaimer comprising:

a main frame, front and rear frame propelling means on the frame having a wheel receiving area, a digging wheel mounted on the frame in the wheel receiving area, a sloper boom pivotally mounted on the frame and extending away from one side of the wheel and having a rotating cutter thereon, a cross conveyor positioned adjacent a lower end of the cutter and extending through the digging wheel for receiving dug materials directly from the cutter and from the digging wheel, and means for raising and lowering the boom relative to the main frame.

18. A reclaimer machine comprising:

a main frame, front and rear frame, propelling means on the frame having a wheel receiving area, a digging wheel mounted on the frame in the wheel receiving area, a sloper pivotally mounted on the frame and extending to one side of the wheel, a cross conveyor positioned adjacent a lower end of the sloper and extending through the digging wheel for receiving dug materials therefrom, means for raising and lowering the sloper relative to the main frame, an auger carried on the frame and extending outwardly beyond the digging wheel and in line with said conveyor for clearing a path for the conveyor during the forward travel of the machine, and digging teeth on the blade of the auger for assisting in the digging of hard materials.

19. A reclaimer comprising:

a main frame, propelling means on the frame, a digging wheel mounted on one side of the frame, a sloper pivotally mounted on the frame and extending on an inclined angle upwardly to one side of the wheel for resting on a pile to be cut down, a cross conveyor positioned adjacent a lower end of the sloper and extending through the digging wheel for receiving dug materials from the wheel and the sloper, troughing means on opposite sides of the conveyor for resisting spillage of dug materials from the conveyor, and means for raising and lowering the sloper relative to the main frame.

20. A reclaimer machine comprising:

a main frame, propelling means on the frame, a digging wheel mounted on the frame, a sloper pivotally mounted on the frame and extending to one side of the wheel, a cross conveyor positioned adjacent a lower end of the sloper and extending through the digging wheel for receiving dug materials therefrom, means for raising and lowering the sloper relative to the main frame, an auger carried on the frame and extending outwardly beyond the digging wheel and in line with said conveyor for clearing a path for the conveyor during the forward travel of the machine, and digging teeth on the blade of the auger and angled sidewise therefrom for assisting in the digging of hard materials.

21. A reclaimer machine comprising:

a main frame, propelling means on the frame having a wheel receiving area, a digging wheel mounted on the frame, a sloper pivotally mounted on the frame and extending to one side of the wheel, a cross conveyor positioned adjacent a lower end of the sloper and extending through the digging wheel for receiving dug materials therefrom, means for raising and lowering the sloper relative to the main frame, an auger carried on the frame and extending outwardly beyond the digging wheel and in line with said conveyor for clearing a path for the conveyor during the forward travel of the machine and with the auger dug material being deposited in the path of the digging wheel, and a direct drive between said auger and gearing along an inside circumferential area of the digging wheel.

22. A material handling machine comprising:

a frame, front and rear frame propelling means supporting the frame with the front frame propelling means being offset to one side of at least one of the rear frame propelling means providing a wheel receiving area, a digging wheel rigidly mounted at one side of said frame in said wheel receiving area and positioned directly ahead of one of the rear frame propelling means and transversely to one side of said front frame propelling means, a conveyor positioned on the frame receiving materials from the digging wheel, a sloper mounted on the frame and angled upwardly and away from one side of the digging wheel for causing materials to be deposited on said conveyor, an auger mounted at one side of said digging wheel forwardly of said sloper for moving material into said digging whel and with the auger clearing the way for a lower end of the conveyor, and means between the frame and the front frame propelling means for raising and lowering the frame and the sloper and digging wheel carried thereon.

23. A reclaimer comprising:

a main frame, frame propelling means on the frame, a digging wheel mounted on the frame, a cross conveyor extending through the digging wheel for receiving dug materials therefrom, a sloper boom pivotally mounted on the frame and extending to one side of the wheel and having a rotating cutter thereon aligned with a leading side edge of the conveyor for depositing material directly thereon.

said sloper cutter being disposed at the leading edge of said boom and wherein a dam is formed at the trailing edge thereof for forming a trough between a cut edge of a pile of reclaimable material and said dam to confine the flow of material to said conveyor, and means for rotating said cutter.

24. A material handling machine comprising:

a frame having frame propelling means including a front frame transporting means, a digging wheel mounted on said frame and positioned at one side of said front frame transporting means, a sloper having means for cutting a sloped surface of the pile extending angularly outwardly and upwardly from the digging wheel, a conveyor carried by the frame and extended on opposite sides of the digging wheel for receiving materials from the digging wheel and the sloper, and means positioned in front of said conveyor for undercutting the pile providing clearance for the conveyor.

25. A material handling machine comprising:

a frame having frame propelling means including a front frame transporting means, a digging wheel mounted on said frame and positioned at one side of said front frame transporting means, a sloper having means for cutting a sloped surface of the pile extending angularly outwardly and upwardly from the digging wheel, a conveyor carried by the frame and extended on opposite sides of the digging wheel for receiving materials from the digging wheel and the sloper, means positioned in front of said conveyor for undercutting the pile providing clearance for the conveyor, and a cone-shaped plow mounted on said frame on an outer side of said digging wheel and projecting diagonally of the digging wheel for plowing material into the path of the digging wheel.

26. A material handling machine comprising:

a frame having frame propelling means including a front frame transporting means, a digging wheel mounted on said frame and positioned at one side of said front frame transporting means, a sloper having means for cutting a sloped surface of the pile extending angularly outwardly and upwardly from the digging wheel, a conveyor carried by the frame and extended on opposite sides of the digging wheel for receiving materials from the digging wheel and the sloper, means positioned in front of said conveyor for undercutting the pile providing clearance for the conveyor, and a cone-shaped plow mounted on said frame on an outer side of said digging wheel and projecting diagonally of the digging wheel for plowing material into the path of the digging wheel, said plow at least partially underlying said conveyor.

27. A material handling machine comprising:

a frame having frame propelling means providing a three-point suspension including a front crawler, steering means on said front crawler for turning the machine, a digging wheel mounted on said frame and positioned at one side of said front crawler, a sloper extending sidewise of the digging wheel, a conveyor carried by the frame for receiving materials from the digging wheel and the sloper, a plow mounted on said front crawler, and means for moving the plow into and out of operative ground engagement.

28. A material handling machine comprising:

a frame having frame propelling means including a front and inside and outside rear crawlers, shielding means mounted on said front crawler and said inside rear crawler for protecting the crawlers from cave-ins, a digging wheel mounted on said frame and positioned at one side of said front crawler and forward of the rear crawlers, a sloper having means for cutting a sloped surface of the pile extending angularly outward and upwardly from the digging wheel, and a conveyor carried by the frame for receiving materials from the digging wheel and the sloper.

29. A reclaimer for loading a material transporting apparatus as the machine is moved along side of a pile, a main frame, longitudinally spaced front and rear frame transporting means secured with the main frame for transporting the same, a digging wheel disposed at one side of the frame having its axis longitudinally between said front and rear transporting means and with said digging wheel being outboard of said front transporting means, cantilever means suspending the digging wheel from its inboard side leaving an outboard side of said digging wheel totally free from interference from any frame structure, the digging wheel having annularly arranged buckets, conveying means extended transversely of the digging wheel and the main frame having one end positioned interiorly of the wheel for receiving material unloaded from the buckets and having an opposite end extending beyond the side of the frame remote from the digging wheel, and a reclaimer boom mounted on said frame and extending outwardly and upwardly from an outboard side of said digging wheel and having means for cutting material on an upper sloped surface of a pile with the cut material being loaded onto said one end of said conveying means.

References Cited

UNITED STATES PATENTS 2,896,342  7/1959  Reising _____ 37—97

FOREIGN PATENTS 1,175,157  7/1964  Germany.

GERALD M. FORLENZA, Primary Examiner

F. E. WERNER, Assistant Examiner

U.S. Cl. X.R.

214—10

UNITED STATES PATENT OFFICE
CERTIFICATE OF CORRECTION

Patent No. 3,500,987  Dated March 17, 1970

Inventor(s) FRED T. SMITH

It is certified that error appears in the above-identified patent and that said Letters Patent are hereby corrected as shown below:

Col. 5, line 31; "80" should read --90--;

Col. 10, line 33, delete the comma (,).

Signed and Sealed
NOV 3 1970

(SEAL)
Attest:

Edward M. Fletcher, Jr.
Attesting Officer

WILLIAM E. SCHUYLER, JR.
Commissioner of Patents